July 21, 1964  B. F. REYNOLDS  3,141,284
WINDROW MOVING DEVICE

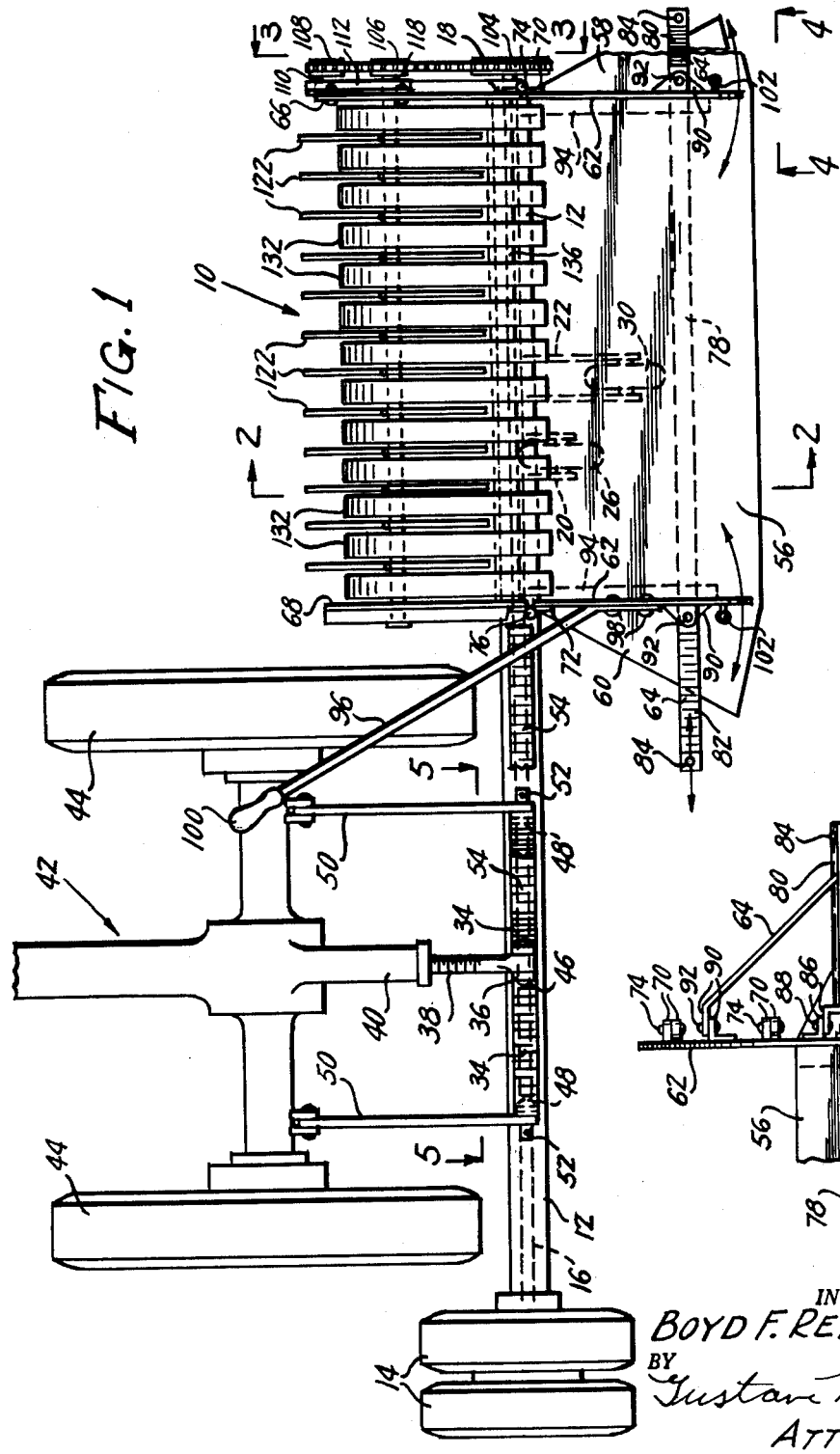

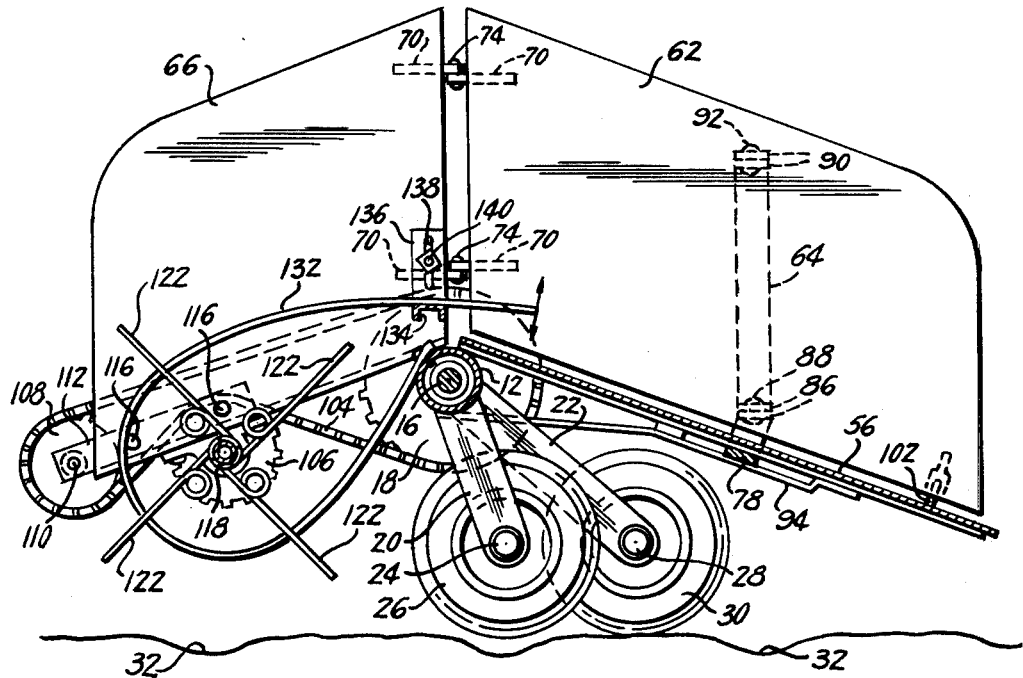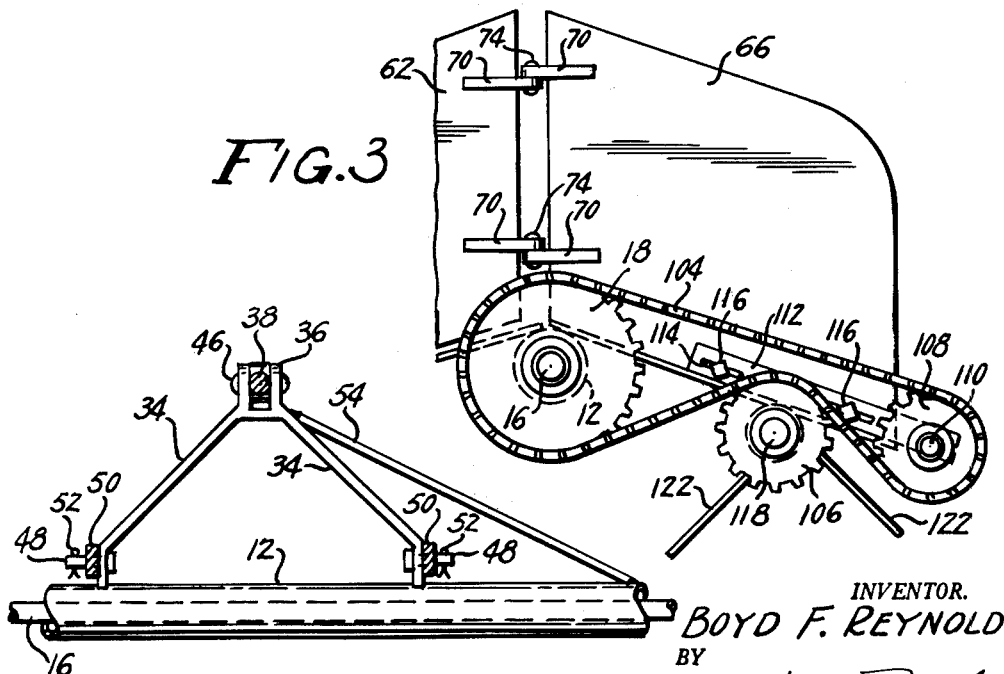

Filed Feb. 6, 1961  3 Sheets-Sheet 3

INVENTOR.
BOYD F. REYNOLDS
BY
ATTORNEY.

3,141,284
WINDROW MOVING DEVICE
Boyd F. Reynolds, Twin Falls, Idaho
(Shady Rest Motel, R.R. 5, Box 105, Nampa, Idaho)
Filed Feb. 6, 1961, Ser. No. 87,176
10 Claims. (Cl. 56—354)

This invention relates to a farm implement, and it more particularly relates to a device for moving windrows.

Farm products which are mowed, cut and raked into windrows, such as hay, dry beans, peanuts, etc., must be dry before baling or threshing. After cutting, these crops have a tendency to settle close to the ground and, if the ground is damp or if it should rain during the drying period, the bottom of the windrow will spoil.

These crops cannot be turned over without some loss of the food products contained therein because the agitation caused during the turning results in the shaking loose or shattering of seeds, beans, berries or the like.

In order to overcome the above difficulties, various machines have heretofore been utilized to lift the windrow up from the ground, move it laterally and lay it down on top of dry stubble where the air can circulate through it to dry it out, all without turning the windrow over. However, these prior machines were generally inefficient and overly complicated, often utilizing a plurality of conveyors or a large number of pick-up teeth. Furthermore, such machines were generally capable only of moving the windrow in one lateral direction, thereby being ineffective in certain positions.

It is one object of the present invention to overcome the aforesaid defects of prior machines by providing a machine which will effectively move a windrow in selectively opposite lateral directions without turning the windrow over and without damaging the food value thereof.

Another object of the present invention is to provide a machine of the aforesaid type which is relatively simple in construction and relatively light and easy to manipulate.

Another object of the present invention is to provide a windrow moving device of the aforesaid type which is adjustable for the type of ground or crop involved and which is adjustable for the type of ground or crop involved and which is capable of riding smoothly on rough or corrugated ground.

Another object of the present invention is to provide a windrow moving device of the aforesaid type which is easily operated in conjunction with a tractor serving as its prime mover and which is easily adjusted from the tractor seat.

Other objects of the present invention are to provide an improved windrow moving device, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawings in which:

FIG. 1 is a top plan view of a windrow moving device embodying the present invention, the device being shown connected to a tractor.

FIG. 2 is an enlarged sectional view taken on line 2—2 of FIG. 1.

FIG. 3 is an enlarged fragmentary end view taken on line 3—3 of FIG. 1.

FIG. 4 is an enlarged fragmentary elevational view taken on line 4—4 of FIG. 1.

FIG. 5 is a fragmentary sectional view taken on line 5—5 of FIG. 1.

Figure 7:
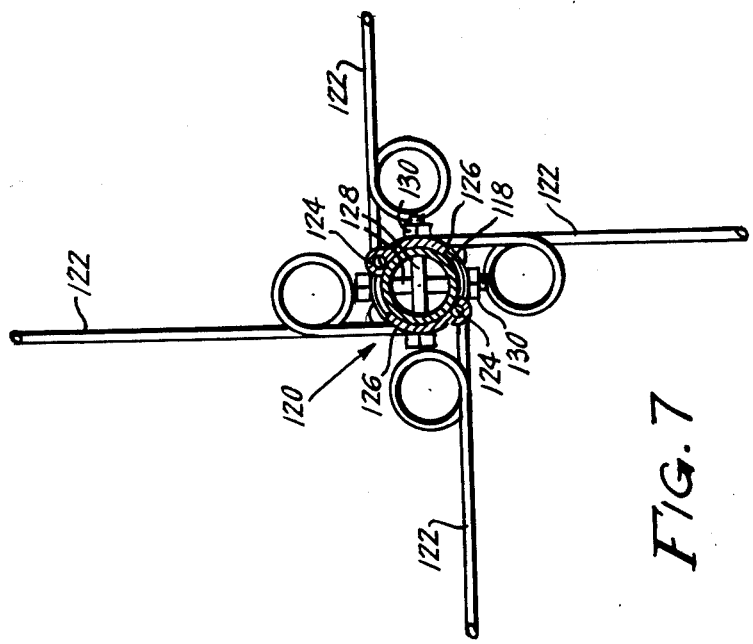
FIG. 7 is a sectional view taken on line 7—7 of FIG. 6.

Referring in greater detail to the drawings wherein similar reference characters refer to similar parts, there is shown a windrow moving device, generally designated 10, comprising a tubular axle 12 having wheels 14 at one end and a shaft 16 extending therethrough. This shaft 16 is operatively connected to the wheels 14 at one end in any conventional manner so as to be rotated thereby and at its opposite end is provided with a sprocket 18.

Depending from the right hand side of the tubular axle 12 (as viewed in FIG. 1) are a pair of brackets 20 and 22. The bracket 20, which extends forwardly of the bracket 22, is provided with a shaft 24 on which is rotatably positioned a wheel 26. The bracket 22 is provided with a shaft 28 on which is rotatably positioned a wheel 30. The fact that the wheels 26 and 30 are staggered in relation to each other, permits the device to ride smoothly over corrugated or rough ground such as results from the irrigation ditches 32 (shown in FIG. 2). The offset nature of the wheels 26 and 30, both sideways and front to back, permits smoothness of ride whether the device is traveling parallel or transverse to the ditches 32.

At the left hand portion (as viewed in FIG. 1), the axle 12 is provided with an A-frame 34 (see FIG. 5), having a yoke portion 36 at its apex. This yoke portion 36 is adapted to receive a hitching bar 38 threaded for adjustable extension from an internally threaded tube 40 of a tractor generally designated 42 and provided with wheels 44. The yoke 36 is apertured to receive a locking pin 46 which also extends through a lateral hole in bar 38.

The A-frame 34 is also provided with lateral pins 48 at each lower leg portion. These pins 48 are adapted to hold pivotal hitch bars 50 on the tractor 42, these bars 50 being held in place by cotter pins 52. A brace bar 54 conventionally secured at one end to the tube 12 and at its other end to the A-frame 34 adjacent the yoke 36 by welding or the like as seen in FIG. 5 is provided for bracing the A-frame 34 when in the coupling position.

Extending downwardly in an inclined direction from the axle 12 is a bottom plate 56 which overlies the wheels 26 and 30. At each side, the plate 56 is provided with a laterally extending inclined wing or extension, as indicated at 58 and 60 respectively (see FIG. 1). These wings 58 and 60 permit swinging lateral adjustment of oppositely-disposed deflector plates designated 62. These deflector plates 62 are hinged to corresponding front stationary side plates, respectively designated 66 and 68, by means of hinges respectively designated 70 and 72 and hinge pins respectively designated 74 and 76.

The deflector plates 62 are simultaneously pivoted in one lateral direction or the other by means of a connecting link or bar 78. The opposite ends of this bar 78 are secured at 84 to guide strap means shown respectively at 80 and 82. Each guide strap means 80 and 82 with the adjacent ends of link 78 forms a slot which extends about the wings 58 and 60. Each guide strap 80 and 82 is connected to its corresponding deflector plates 62 by an inclined brace bar, such as shown at 64 in FIG. 4, the guide strap means being pivoted to the corresponding deflector plates 62 by a hinge and hinge pin such as shown at 86 and 88 in FIG. 4 and the brace bar 64 being pivotally connected to the deflector plate 62 by a hinge and hinge pin such as shown at 90 and 92 in FIG. 4. The bar 78 is guided in its longitudinal movement relative to bottom plate 56 by a pair of oppositely positioned guide straps 94.

For the purpose of swinging the deflector plates 62 into adjusted position, there is provided a lever 96 which is riveted or otherwise secured, as at 98, to one deflector plate 62. The lever 96 is provided with a handle 100 which is within reach of the operator seated on the tractor 42.

A roller catch 102 is provided on each deflector plate 62 (see FIG. 2) for the purpose of holding the respective deflector in either extreme position by dropping over the corresponding edge of the bottom wing plate 58 or 60. The hinge pins 74 and 76, in order to be loose enough to act as pivots, will of necessity also be loose enough to permit the plate 62, when unsupported adjacent its end by roller 102, to sag downwardly when roller 102 passes over the edge of the bottom wing plate 58 or 60. This sagging weight will have to be overcome as roller 102 climbs back up over the edge when the deflector is moved away from its extreme position. Thus, the roller 102 provides the same type of latch action as is provided by a "bullet" latch.

The sprocket 18 is provided with an endless chain 104 extending over a driven sprocket 106 after passing around a tension sprocket 108. The sprocket 108 is mounted on a shaft 110 extending from a bracket 112 having elongated slots 114 therein. These slots 114 are adapted to receive bolts 116 extending from plate 66 for holding the bracket 112 in adjusted position.

Figure 6:
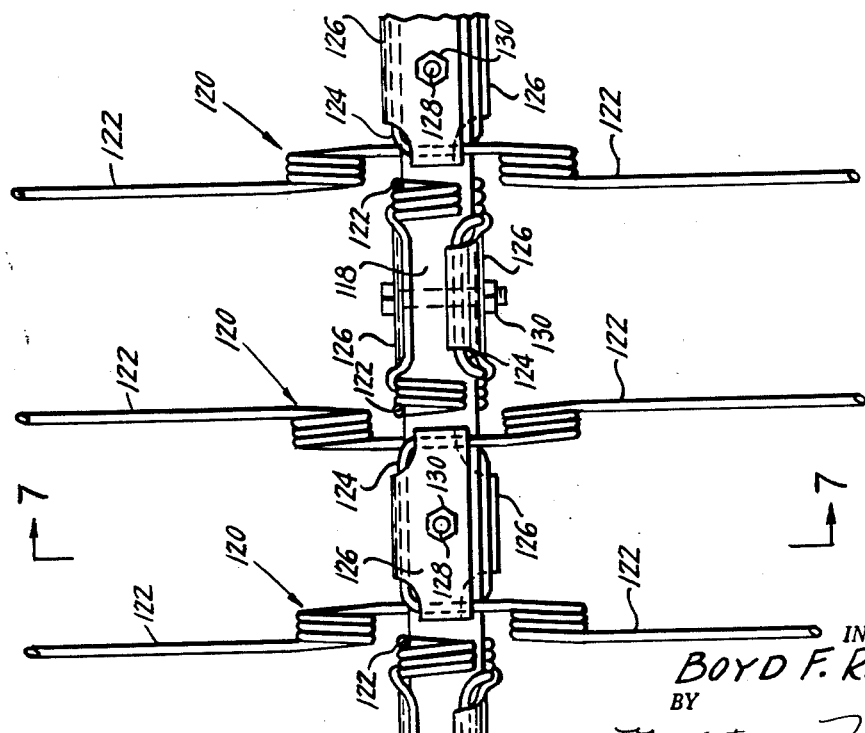
FIG. 6 is an enlarged, partly broken away elevational view of the details of the pick-up finger assembly.

The sprocket 106 is mounted on a shaft 118 extending laterally to the opposite plate 68. Mounted on this shaft 118 are a plurality of equidistantly-spaced pick-up finger units 120, each unit 120 comprising four pick-up fingers 122 spaced 90 degrees from each other. The fingers 122 of each unit 120 are integrally formed coiled strips and each unit 120 consists of two fingers 122 integrally connected together by a bight section 124 therebetween, the units 120 being therefore substantially U-shaped when viewed in elevation (see FIG. 6). Each bight section 124 is clamped in place by clamps 126 and clamping bolts 128 combined with nuts 130. The clamps 126 are alternately oppositely positioned (as shown in FIG. 6). Thus, there are four units 120 spaced 90 degrees about shaft 118, as seen in FIG. 7.

Between each pair of adjacent stripper fingers 122 is arranged a bowed, flexible stripper 132. Each stripper 132 is mounted on a transverse bar 134 (see FIG. 2) and at each end, the bar 134 is supported by a vertically adjustable plate 136 having an elongated vertical slot 138 through which extends a locking bolt 140 extending laterally from the respective side plate 66 or 68. In this manner, the strippers 132 are vertically adjustable according to the crops and the other conditions.

In operation, the windrow moving device 10, hitched to the tractor 42, is moved across the ground with the deflector plates 62 adjusted to the desired angle and with the strippers 132 adjusted to the desired height. As the device moves, the rotation of the wheels 14 are translated to the sprocket 18 which acts through chain 104 and sprocket 106 to rotate shaft 118. This rotates pick-up fingers 122 which pick up the windrow and by moving past the strippers 132, extending above bottom plate 56, deposit it on the bottom plate 56, without turning the windrow over, where it is deflected laterally in one direction or the other depending on the positions of the deflector plates 62 and then deposited on the ground in laterally displaced position relative to its original position.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A windrow moving device comprising an axle adapted to be hitched to a tractor, supporting wheels on said axle, at least some of said wheels being offset from each other both axially and radially, a downwardly and rearwardly inclined bottom plate mounted on said axle, a pair of side deflector plates, one at each side of said bottom plate, a pair of oppositely disposed stationary side plates mounted on and extending forwardly of said axle, said deflector plates being individually hinged to respective stationary plates, a plurality of rotatable pick-up units axially aligned between said stationary plates, each unit including a plurality of pick-up fingers, a plurality of strippers alternating with said pick-up units, said strippers extending rearwardly over the upper forward edge of said inclined bottom plate, and drive means operatively connecting said pick-up units with at least one of said wheels.

2. The windrow moving device of claim 1, and means operatively connecting said deflector plates for simultaneous swinging movement on their respective hinges, and a lever for moving said deflector plates on their hinges, said lever being arranged to be accessible to an operator on the tractor.

3. The windrow moving device of claim 1, said pick-up fingers on each unit being integrally connected and having a coiled portion for increased flexibility.

4. The windrow moving device of claim 1, and a roller catch on each deflector plate for holding the corresponding deflector plate in position by dropping over the corresponding edge of the bottom plate.

5. A windrow moving device comprising a tubular axle, a shaft rotatably extending through said tubular axle, a wheel operatively connectively connected to one end of said shaft at one end of said axle, a drive sprocket fixed on the other end of said shaft, a pair of laterally spaced stationary vertical side plates extending forwardly of said axle adjacent said drive sprocket end, a driven sprocket spaced from and in the same plane with said drive sprocket, an endless chain connecting said driven sprocket to said drive sprocket, an auxiliary shaft extending between said stationary side plates and operatively connected to said driven sprocket, a bottom plate inclining downwardly and rearwardly from said tubular axle, a pair of adjustably swingable vertical side deflector plates extending rearwardly over said bottom plate, each deflector plate being hinged to a respective stationary side plate, means for swingingly adjusting said deflector plates simultaneously, a plurality of windrow pick-up units mounted on said auxiliary shaft for rotation therewith, each unit including a plurality of circumferentially-spaced, flexible, pick-up fingers, a series of bowed strippers alternating with said pick-up fingers and extending rearwardly to discharge the windrow onto said bottom plate, said bottom plate then discharging the windrow from its inclined rear end to the ground, and auxiliary wheel means operatively mounted on said tubular axle in spaced relation to said wheel.

6. The windrow moving device of claim 5, said auxiliary wheel means comprising a pair of wheels axially and radially offset from each other.

7. The windrow moving device of claim 5, and means for mounting said strippers for simultaneous vertical adjustment.

8. The windrow moving device of claim 5, and an adjustable tension sprocket for varying the tension of said chain.

9. The windrow moving device of claim 5, said means for adjusting said deflector plates including a lever arranged to be accessible to an operator in a tractor to which said axle is hitched.

10. In a windrow moving device, a pair of spaced apart forwardly extending vertical stationary side plates, a shaft rotatably mounted between said stationary side plates, a plurality of pick-up units mounted on said shaft for rotation therewith, a series of bowed strippers alternating with said pick-up units, a bottom plate inclining downwardly and rearwardly from beneath the rear ends of said strippers, a pair of spaced apart vertical swingable deflector side plates extending rearwardly over said bottom plate, each rearwardly extending deflector side plate being hinged to a said respective forwardly extending stationary side plate, and means simultaneously swingingly adjusting and securing said deflector side plates.

References Cited in the file of this patent
UNITED STATES PATENTS

| | | |
|---|---|---|
| 2,165,088 | Anderson | July 4, 1939 |
| 2,529,422 | Sampson | Nov. 7, 1950 |
| 2,627,158 | Van Sickle | Feb. 3, 1953 |
| 2,667,731 | Nerness | Feb. 2, 1954 |
| 2,714,796 | Haupt et al. | Aug. 9, 1955 |
| 2,911,780 | Brady | Nov. 10, 1959 |
| 3,059,403 | Bamford et al. | Oct. 23, 1962 |